P. A. HUNTER.
WAGON JACK.
APPLICATION FILED MAY 15, 1913.
1,083,614.
Patented Jan. 6, 1914.
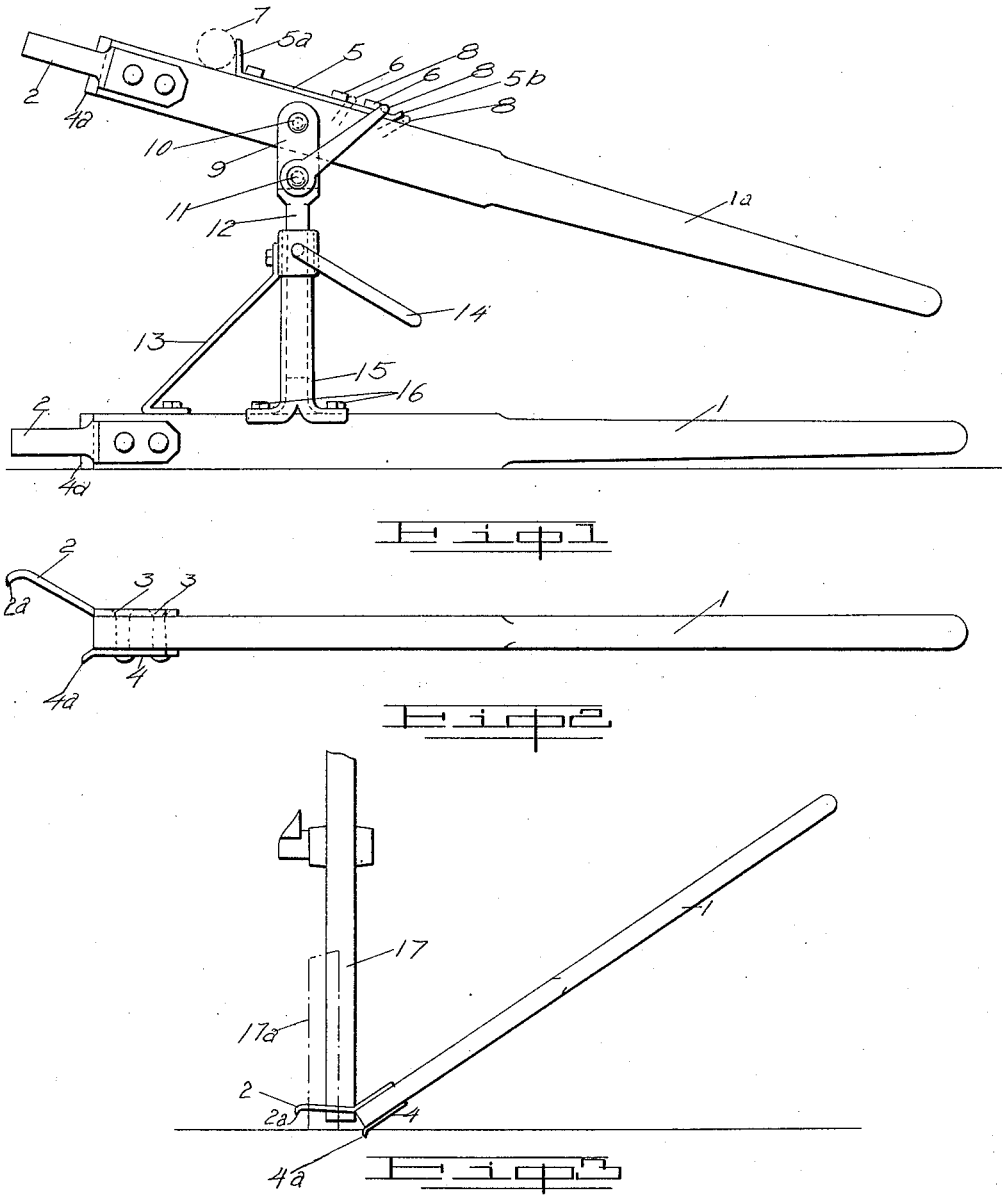

UNITED STATES PATENT OFFICE.

PERRY A. HUNTER, OF CLACKAMAS, OREGON.

WAGON-JACK.

1,083,614. Specification of Letters Patent. Patented Jan. 6, 1914.

Application filed May 15, 1913. Serial No. 767,774.

*To all whom it may concern:*

Be it known that I, PERRY A. HUNTER, a citizen of the United States, residing at Clackamas, in the county of Clackamas and State of Oregon, have invented a certain new and useful Improvement in Wagon-Jacks, of which the following is a specification.

The present invention pertains to an improvement in wagon jacks, and it has for its principal object, to provide a device adapted to be applied to the wheel of a vehicle for the purpose of removing and restoring the wheel. The device is constructed with a view to extending the members so as to fit them to wheels of varying sizes, and a still further object is to employ one of the members as a lever and to provide means by which it may be locked at predetermined position for the purpose of raising external objects and sustaining them in elevated position. These and other objects are accomplished by the mechanism illustrated in the accompanying drawing, in which—

Figure 1 is a plan view of the device showing its use for raising an object such as the axle of a wheel. Fig. 2 is a side elevation of one of the members. Fig. 3 is a side elevation showing a fragmentary portion of a wagon wheel with the wagon jack applied thereon, and the wheel slightly raised and withdrawn from normal position.

Referring to the drawing in detail, 1 and 1$^a$ represent the handle bars of a wagon jack which comprises two members of convenient size and strength to be easily manipulated and which may readily serve the purpose of raising objects of such weight and dimensions as the wheels or axles of vehicles.

2 is a bar or plate secured upon the upper face at the lower end of each of the handle bars, each having a forwardly projecting portion which rises at an angle from the face of the handle bars so as to form a wheel engaging element, and which terminates in a downwardly curved portion 2$^a$. Upon the lower face of each member 1 and 1$^a$ is secured a fulcrum plate 4 having a slight projection 4$^a$ extending beyond the end of the bar 1 and 1$^a$ respectively. These two plates are secured upon the bar by the transverse bolts 3 extending entirely through the bar and the said plates. At a convenient distance from the lower ends of the bars is secured a transverse tubular element 15 by means of suitable bolts 16, which is sustained by means of a brace 13. Within this tubular member is secured an inner member 12 which is forked at its outer end 9 and adapted to embrace the handle 1$^a$ to which it is pivotally secured upon the pin 10. These members are by this means maintained at a proper distance apart at all times by means of the member 12 telescoping within the member 15 and they are firmly secured at any desired point by means of a suitable set screw operated by the handle 14.

Upon the outer face of the movable member 1$^a$, at a point intermediate the transverse member and the lower terminal, is secured a bar 5 by means of the bolt 6, having an angularly disposed terminal portion 5$^a$ which is raised from the bar 1$^a$ so as to form a catch to sustain the axle 7 of a vehicle. In this use of the device the fixed member 1 will be placed upon the ground beneath the vehicle to form a base and the transverse member will be adjusted to correspond with the height of the axle. The instrument will then be raised beneath the axle and adjusted to position; then by depressing the handle bar 1$^a$ the vehicle will be raised so as to clear the ground for the purpose of removing the wheel 17 or for any purpose that may be desired. The handle being depressed, the U-shaped bar 8 which is secured to the member 12 on the pivot pin 11, is adapted to engage over the heads of the bolts 6 or the rear terminal portion 5$^b$ of the bar 5 so as to maintain the bar 1$^a$ in depressed position to sustain the vehicle. When it is desired to restore the vehicle the U-shaped bar will be raised from the catches to release the engagement of the handle bar 1$^a$, which will allow the forward portion of the latter to become depressed and thus permitting the vehicle to assume its normal position.

In the use of the apparatus for removing vehicle wheels, as shown in Fig. 3, the projection 4$^a$ of the plate 4 forms a fulcrum upon which the jack bears, the points 4$^a$ engaging in the earth to prevent slipping as the handle bars are depressed, thereby elevating and withdrawing the wheel upon the arms 2 from the position shown in dotted lines at 17$^a$. After the lubrication of the spindle the wheel may be quickly restored by throwing forward the handle bars so as to bring the terminals 2$^a$ of the arms 2 upon the ground so as to form a lever against the outer face of the wheel, which quickly and easily restores the wheel to position.

In this manner I have provided a novel instrument of great utility and convenience and which is inexpensive in construction.

Having thus described my invention what I claim as new, is—

1. An article of the character described comprising a pair of operating levers, an extensible member pivotally securing them together, a wheel engaging element secured at the terminal of each of said levers and a fulcrum plate secured on the lower face at the end of each lever, each plate having a depending terminal portion.

2. An article of the character described comprising a pair of levers, a telescoping member pivotally securing them together, a wheel engaging element secured at the terminal of each of said levers, each terminating in a down curve adapted to engage the ground when the handles are raised, a fulcrum plate secured on the lower face of the terminal of each lever, and means for releasably locking the levers in fixed relation to each other.

3. An article of the character described comprising a pair of levers, an arm upon the terminus of each of said levers adapted to engage the rim of a vehicle wheel, each terminating in an earth engaging hook, and a telescoping member pivotally uniting said levers.

4. An article of the character described comprising a pair of levers, a telescoping member pivotally securing them together, a wheel engaging element secured at the terminal of each of said levers, each terminating in a down curve adapted to engage the ground when the handles are raised, a fulcrum plate secured on the lower face of the terminal of each lever, and a U-bar encompassing one of said levers and pivotally secured upon the telescoping member, whereby the lever may be locked in fixed relation to its counterpart.

In testimony whereof I affix my signature in the presence of two witnesses.

PERRY A. HUNTER.

Witnesses:
R. P. GRADY,
ELVA HUNTER.

Copies of this patent may be obtained for five cents each, by addressing the "Commissioner of Patents, Washington, D. C."